United States Patent [19]

Rorex, Sr.

[11] Patent Number: 5,105,845

[45] Date of Patent: Apr. 21, 1992

[54] CONTROL APPARATUS FOR REGULATING LIQUID LEVELS IN LIQUID STORAGE TANKS

[76] Inventor: Robert W. Rorex, Sr., P.O. Box 584, King, N.C. 27021

[21] Appl. No.: 626,513

[22] Filed: Dec. 12, 1990

[51] Int. Cl.$^5$ .............................................. F17D 1/13
[52] U.S. Cl. ..................................................... 137/256
[58] Field of Search ............... 137/256, 255, 265, 266, 137/111

[56] References Cited

U.S. PATENT DOCUMENTS 2,703,138  3/1955  Amon ........................... 137/265 X Primary Examiner—Alan Cohan

[57] ABSTRACT

A control apparatus for regulating liquid levels in liquid storage tanks to supplement a liquid supply serving a liquid operational system which includes a normally full primary liquid storage tank operable to selectively supplement the liquid supply serving the operational system, an input/output flowpipe connecting the liquid supply and operational system to the primary storage tank, and at least one normally full secondary liquid storage tank connected to the first tank, the input/output flowpipe and the liquid supply serving the operational system. The input/output flowpipe connecting the primary and secondary tanks has means to selectively open the secondary storage tank to the liquid supply serving the operational system when the system requirements cause liquid to flow from the primary storage tank so that liquid flows from the secondary storage tank to further supplement the system. When the liquid level in the secondary storage tank reaches a predetermined lower level, the input/output flowpipe to the secondary storage tank is closed to permit first the primary storage tank and then the secondary storage tank to refill.

4 Claims, 2 Drawing Sheets

CONTROL APPARATUS FOR REGULATING LIQUID LEVELS IN LIQUID STORAGE TANKS

BACKGROUND OF THE INVENTION

1. Field of the Invention

This invention relates to a new and useful improvement in an automatic valve and more particularly, to a control apparatus for regulating liquid surface levels in liquid storage tanks to supplement a liquid supply serving liquid based operational systems such as community water systems or fuel supplying operations.

2. Description of the Prior Art

There are a number of valves that have been connected in a liquid supply line to a storage tank that will close when the liquid in the tank has reached a predetermined level. Such valves are usually controlled by motors, springs, floats and weights and operate successively to permit flow of liquid to and from successively arranged tanks. Those devices that use electrical elements for operational purposes can become hazardous when the stored or released liquid is flammable or otherwise hazardous. Electrical and mechanical devices can produce sparks that might well ignite such a mixture.

From the foregoing, there is perceived a need for an inexpensive and efficient mechanism to control liquid levels which will eliminate dangerous sparks and shorts that might otherwise occur when using conventional systems.

SUMMARY OF THE INVENTION

The present invention is a control apparatus for regulating liquid surface levels and liquid storage tanks that are utilized to supplement a liquid supply serving a liquid based operational system. It includes, in its broadest form, a liquid supply connected by an input/output flowpipe to a secondary liquid tank. The input/output flowpipe is then connected to a secondary liquid storage tank so that both tanks can function to supplement the liquid supply serving the liquid operational system as needed and will automatically refill thereafter. The input/output flowpipe carries means for selectively opening and closing a secondary storage tank with respect to the liquid supply serving the operational system. Requirements cause liquid to flow from the primary storage tank supplementing the liquid supply, and liquid then flows from a secondary storage tank to the operational system to further supplement the liquid requirements of the system. The flow from the secondary storage tank is actuated by the liquid level in the primary storage tank which causes liquid to flow from the secondary storage tank to supplement the liquid supply serving the operational system. When the liquid in the secondary tank has reached its lowest desirable level, the positioning of that liquid level initiates the refilling process and liquid flows back into the secondary storage tank. The selective opening and closing means includes a housing, a lever arm extending from the housing, a plug secured to the lever arm, a cable secured at one end to the lever arm and at the other to a weighted float positioned on the surface of the liquid held by the secondary storage tank, the float being responsive to the liquid level in the secondary tank to selectively open and close the opening with the plug.

BRIEF DESCRIPTION OF THE DRAWINGS

Objectives and primary features of the present invention will become apparent from the following detailed description taken in conjunction with the accompanying drawings wherein like characters of reference designate like parts through the several views, which drawings disclose at least one embodiment of the invention. It is to be understood, however, that the drawings are designed for the purpose of illustration only and are not intended as a definition of the limits of the invention.

DETAILED DESCRIPTION OF THE PREFERRED EMBODIMENT

Figure 4:
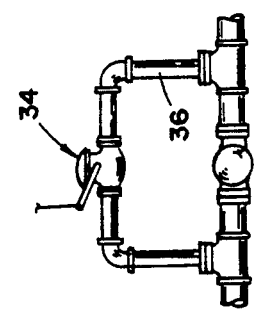
FIG. 4 is a plan view of the valve assembly used to selectively open and close the secondary storage tank shown in FIG. 1.
Figure 1:
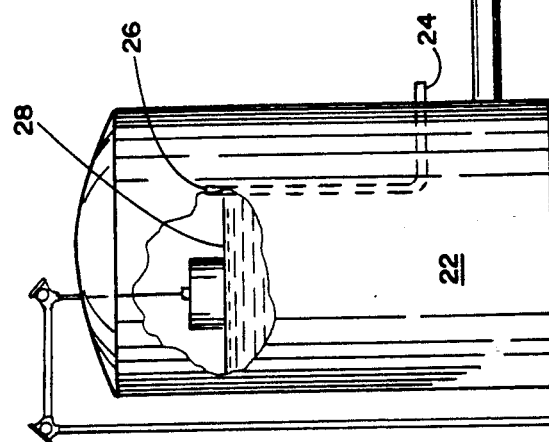
FIG. 1 is a side elevational view of the primary embodiment of the present invention showing the primary and secondary storage tanks, their difference in elevation, their connection to the liquid supply serving a liquid operational system, and the valve mechanism regulating the outflow and inflow of liquid to and from the primary and secondary storage tank.
Figure 1:
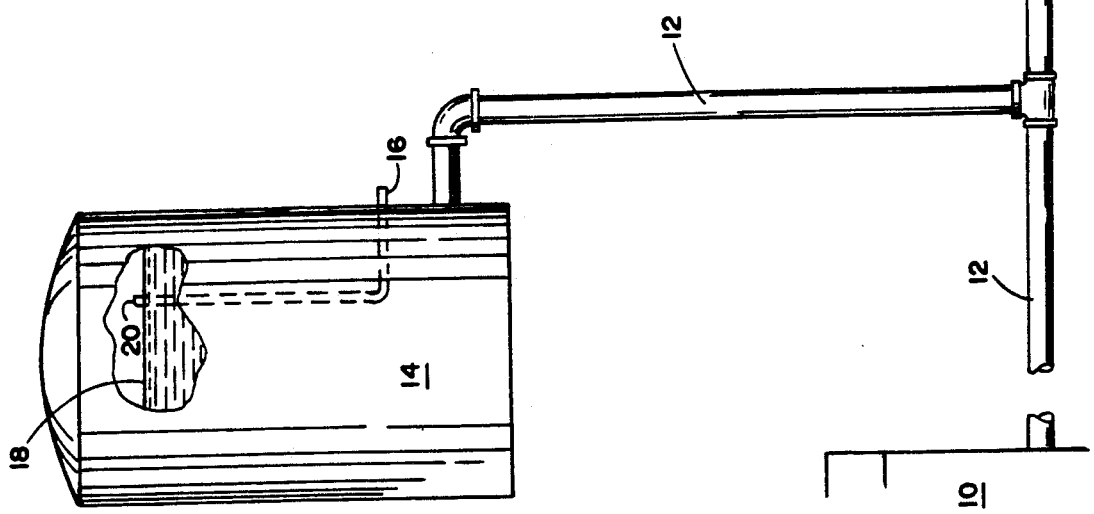

Referring now to the drawings and particularly to FIG. 1, a liquid supply 10 which might be a reservoir, a pump house, or any other typical liquid source which functions to supply an operational system such as a community water supply, a fuel distribution network or the like. The apparatus comprising the present invention is connected to that liquid supply by an input/output flowpipe 12 which extends to an elevated primary storage tank 14. The tank 14 is equipped with an overflow pipe 16 to ensure that the liquid level 18 does not extend above the end 20 of pipe 16. The input/output 12 extending to tank 14 functions to carry incoming and outgoing liquid to and from tank 14.

Input/output flowpipe 12 then extends to a valve assembly shown generally as to 0 which will be described in greater detail subsequently. Input/output flowpipe 12 leaves valve assembly 20 and operably connects to secondary liquid storage tank 22. Tank 22 also has an overflow pipe 24 whose upper end 26 prevents the liquid surface 28 exceeding the location of the tube end 26.

The valve assembly 20 has two gate valves 30,32 that may be used to isolate sections of the valve assembly or control apparatus for maintenance or cleaning. A primary check valve 34 is positioned in a by-pass section shown generally as 36. A spare or replacement checkvalve 38 may be positioned in the common portion 40 of input/output flow pipe 12 and kept in the closed condition until there is some reason to close and deactivate valve 34 and activate the spare or replacement valve 38.

Figure 2:
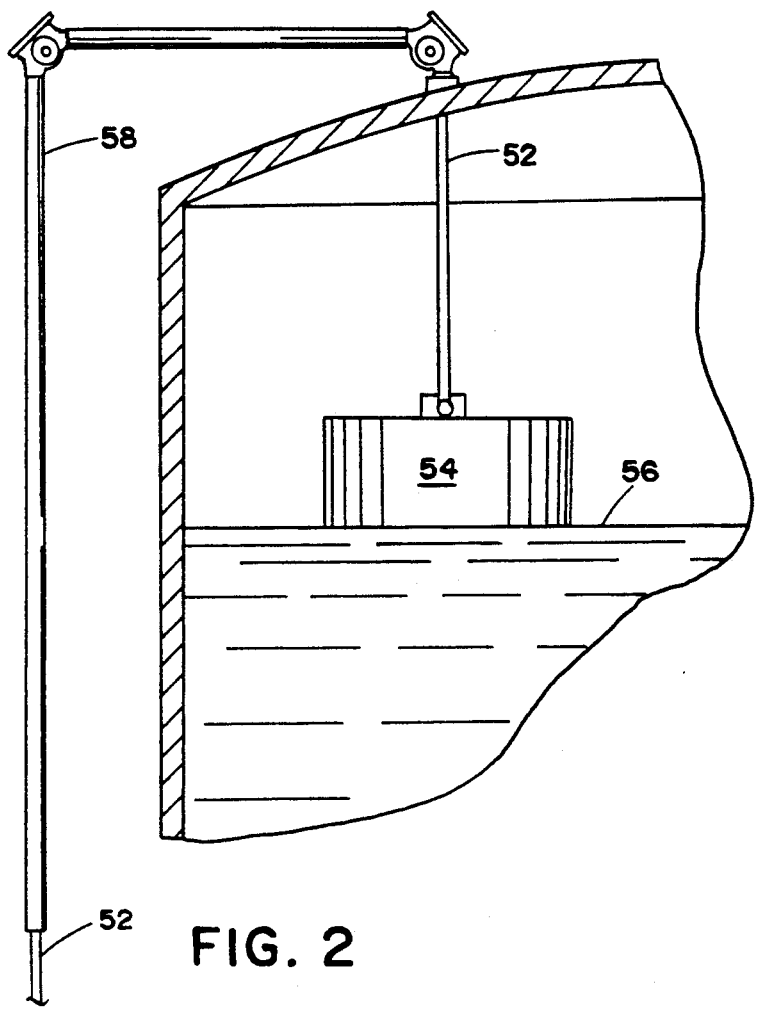
FIG. 2 is an enlarged, fragmentary, and sectional view of a portion of the secondary storage tank and the valve mechanism controlling the outflow and inflow of liquid from and to that storage tank.
Figure 3:
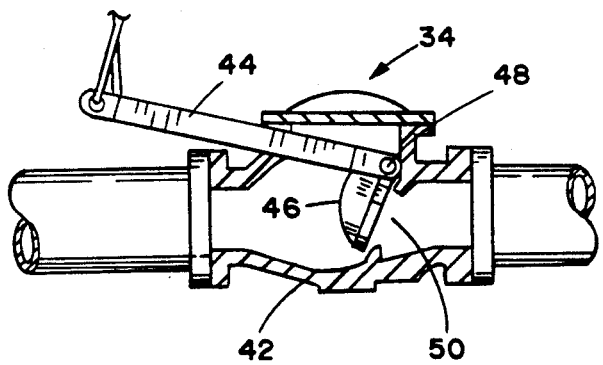
FIG. 3 is a side elevational, fragmentary and sectional view of the lever arm and plug in an open position with respect to the opening in the housing connecting the input/output flowpipe to the secondary liquid storage tank.
Figure 3:
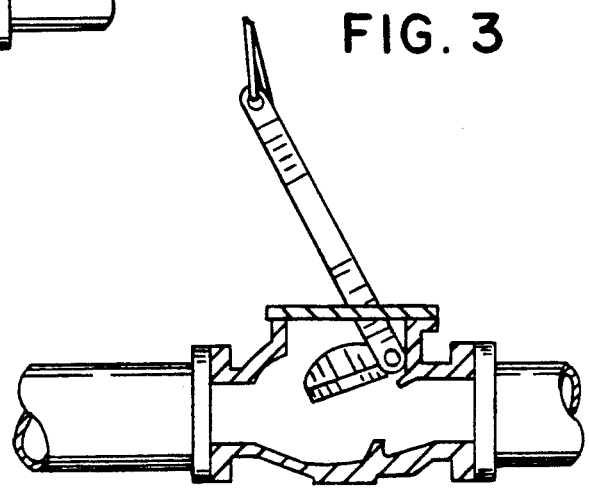

Check valve 34 has a housing 42, a lever arm 44, and a plug 46 fixedly secured to lever arm 44, both members being pivotally movable about pivot rod 48. Liquid flow is precluded through housing 42 when plug 46 closes opening 50 as shown in FIG. 2. FIG. 3 shows plug 46 in the open position thereby permitting liquid flow through housing 42.

A cable 52 is secured at one end to lever arm 44 and at the other end to a float 54 inside secondary storage tank 22. Float 54 is responsive to the movement of liquid surface 56 inside secondary storage tank 22 as shown in FIG. 2. Piping 58 is used to support and protect cable 52 in the manner shown. The cable is threaded through the piping which utilizes 90 degrees L's that contain pulleys (not shown) therein to ensure responsive movement of cable 52 within piping 58.

The operation of the present invention provides a means to allow one or more secondary liquid storage tanks positioned at lower levels to a primary storage tank to be filed to a maximum capacity without overflowing. At the beginning of the operation, all of the tanks are filed to maximum capacity. When the operational system demands begin to drain the primary storage tank 14 and the liquid level 18 therein reaches the same liquid level 28 in secondary storage tank 22, the static pressure head on check valve 34 is relieved. The valve will then open to supplement the liquid supply provided by primary storage tank 14. As the liquid level 28 descends, float 54 will maintain plug 46 in the open position (FIG. 3). When operational system demand has been satisfied, the liquid supply will begin to refill tanks 14 and 22. Plug 46 is held open against the positive head by float 54 and the mechanical leverage of levers arm 44 and plug 46 through the cable 52 and its associated piping 58. As the liquid level reaches its maximum level in tank 22, float 54 releases tension in cable 8 to allow plug 46 to close (FIG. 2). The liquid level in tank 14 will continue to fill to maximum capacity. When the operational system demands begin to drain tank 14, the sequence is repeated.

Although one or more embodiments have been shown and described in detail, it will be obvious to those having ordinary skill in the art that the details of the construction of these particular embodiments may be modified in a great many ways without departing from the unique concept presented. It is therefore intended that the invention be limited only by the scope of the appended claims rather than by particular details of construction shown except as specifically stated in the claims.

The embodiments of the invention in which an exclusive property or privilege is claimed are defined as follows.

What is claimed is:

1. A control apparatus for regulating liquid levels in a liquid storage tank comprising: a liquid supply serving a liquid operational system; a normally full primary liquid storage tank selectively supplementing said liquid supply and serving the operational system; an input/output flow pipe connected to said liquid supply in the operational system; at least one normally full secondary liquid storage tank, the maximum liquid surface level of said secondary liquid storage tank being lower than the maximum liquid surface level of said primary liquid storage tank, said input/output flow pipe connecting said primary and secondary storage tanks to said liquid supply in the operational system; and means selectively opening said secondary storage tank to said supply and the operational system when the operational system requirements cause liquid to flow from said primary storage tank supplementing the liquid supply so that liquid flows from said secondary storage tank to the system to further supplement the system and said primary storage tank, and, when actuated by the liquid level in said secondary storage tank, closing said input/output flowpipe to said secondary storage tank when the liquid reaches a preselected level in said secondary storage tank and thereafter permits said normally full primary storage tank to refill, said selectively opening and closing means including a check valve assembly having a housing, a lever arm extending from within to outside the housing, a plug secured to said lever arm within said housing, and an opening within said housing to said input/output flowpipe whereby said lever arm and said plug are movable from a closed position with respect to an open position and back again as said secondary storage tank is selectively activated to open and close, said lever arm and plug being movable by a connected float and cable combination that are responsive to the water level in the secondary storage tank, and said input/output flowpipe having gate valves selectively isolating said selectively opening and closing means and secondary storage tank from said supply, said principal storage tank, and the operational system.

2. The apparatus as claimed in claim 1 wherein said principal and secondary storage tanks have overflow pipes positioned at a predetermined location within said tanks.

3. The apparatus as claimed in claim 2 further comprising a bypass pipeline around said selectively opening and closing means.

4. A control apparatus for regulating liquid surface levels in a liquid storage tank comprising: a liquid supply serving a liquid based operational system such as a community water system or the like comprising: a volume of liquid constituting a liquid supply for activating and continuously serving a liquid-driven operational system; a normally full, when inactive, primary liquid storage tank for selectively supplementing said liquid supply in meeting the requirements of the operational system for liquid; an input/output flowpipe connected to said liquid supply and the liquid driven operational system; at least one normally full and closed secondary liquid storage tank, said input/output flowpipe connecting said primary and secondary liquid storage tanks to each other and to said liquid supply in the operational system; and means selectively opening said secondary storage tank to said liquid supply and the operational system when the operational system requirements cause liquid to flow from said primary storage tank supplementing said liquid supply so that liquid flows from said secondary storage tank to the operational system to further supplement the liquid requirements of the system and said primary storage tank, and, when activated by the liquid level in said secondary storage tank, closing said input/output flowpipe to said secondary storage tank when the liquid reaches a preselected level in said secondary storage tank and thereafter to permit said now less-than-full but normally full primary storage tank to refill, said selectively opening and closing means including a housing, a lever arm extending from within said housing to outside said housing, a plug secured to said lever arm within said housing, an opening within said housing connecting said input/output flowpipe to said secondary liquid storage tank, said primary liquid storage tank, and the operational system, a cable adhered at one end to said lever arm, a weighted float positioned on the surface of the liquid held by said secondary liquid storage tank, said cable connected at its other end to said float, said float being responsive to the liquid level in said secondary storage tank to selectively open and close said opening with said plug.

* * * * *